FIG. I
FIG. II
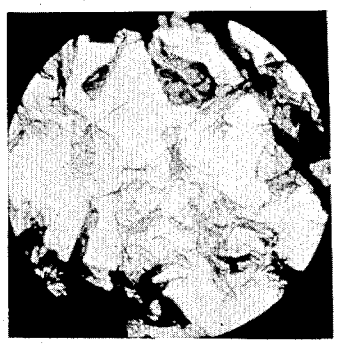
FIG. III
FIG. IV
FIG. V
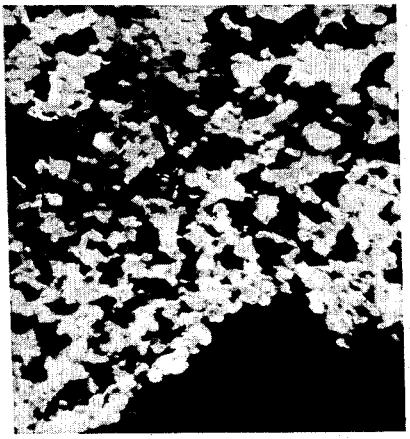
INVENTOR
HANS SCHOTT
BY
ATTORNEY FIG. VI
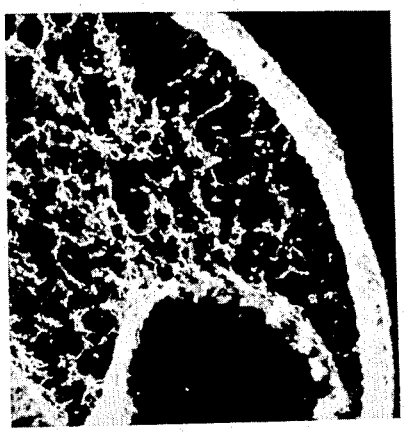
FIG. VII
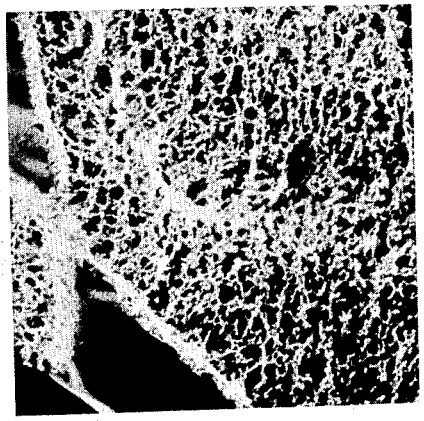

United States Patent Office 3,114,672
Patented Dec. 17, 1963

3,114,672
SHEET FORMING BINDER PARTICLES COMPOSED OF THERMOPLASTIC POLYMER DISPERSED IN A POLYSACCHARIDE MATRIX
Hans Schott, Fort Lee, N.J., assignor to E. I. du Pont de Nemours and Company, Wilmington, Del., a corporation of Delaware
Filed Aug. 9, 1961, Ser. No. 130,327
8 Claims. (Cl. 162—157)

This invention relates to novel and useful composite binder particles and to the use of such particles in sheet products. More specifically, it relates to composite binder particles containing synthetic polymers and their use in papermaking processes.

OBJECTS

It is an object of this invention to provide a composite binder particle which combines the surface characteristics of a natural organic polymer with the thermoplastic behavior of synthetic organic polymers.

It is a further object to provide hydrophilic, water-dispersible pulp of binder particles useful in the preparation of wet-laid non-woven sheets and fabrics, and which is specifically useful in that it provides a source of synthetic organic polymer binder for the said sheets and fabrics.

A further object is to provide synthetic polymeric particulate materials as a binder particle component free of any tendency to agglomerate and coalesce while in aqueous suspension even though they may consist to a large extent of a polymer material which is sticky or tacky and self-coalescible.

In addition, it is an object to provide a process for the preparation of composite binder particles.

Other objects will be apparent from the specification and claims which follow.

ILLUSTRATIONS

FIGURES I to VII inclusive are photomicrographs of typical products of the present invention as identified more fully in Example 1.

STATEMENT OF INVENTION (a) *Products.*—These objects are achieved in a pulp of sheet-forming binder particles of a precipitated polysaccharide matrix containing a dispersed phase of particulate synthetic thermoplastic polymer. By "polysaccharide" is meant a natural carbohydrate polymer or derivative thereof having plurality of anhydroglucose rings composing a polymer chain having a degree of polymerization of at least 10. By "precipitated" is meant that the polysaccharide, either soluble in an aqueous system or transformable by aqueous-phase process from an aqueous-soluble polysaccharide derivative into an insoluble form is shaped by precipitation. Preferably the polysaccharide which forms the matrix of the said particle is a member of the class consisting of cellulose, alginate, soluble starch and galactomannan gums. Cellulose is the most desirable polysaccharide, both because of its availability and because of its compatibility with rayon staple fibers and natural cellulosic fibers. Any thermoplastic synthetic polymer may be used as the dispersed phase, but hydrocarbon polymers are specially desirable, the most preferred being halogenated hydrocarbon polymers, due to their highly thermoplastic nature, their chemical stability, and the ease with which they may be obtained as fine dispersions.

The dispersed polymer constitutes from about 75% to about 95% by weight of the binder particle of this invention, the remainder of the particle being the polysaccharide defined above. The dispersed polymeric phase is solid and is generally of high molecular weight, in the film-forming range or higher, with a particle size ranging from colloidal up to particles passing through a number 80 mesh screen and retained on a number 100 mesh. Particle shape of the dispersed phase is not critical and these particles may be uniform or non-uniform, regular or irregular, granular or non-granular, film-like, fiber-like, spherical, flake-like or other shape. For best results, and for greatest ease of preparation, materials in the colloidal range are preferred.

While the morphology of the composite binder particles of this invention may vary widely, in general they are irregular in shape and frazzled, as evidenced by a broad spectrum of particle size distribution when measured, for example, on a Clark classifier. They present a high specific surface area as demonstrated by their water absorption capacity, i.e. they possess the ability to absorb 2 gm. of water per gram of particle. The binder particles of the pulp of this invention possess an ability to form a waterleaf having a couched wet tenacity of at least about 0.034 lb./in./oz./yd.$^2$ when an aqueous dispersion of the said pulp is deposited from a liquid suspension upon a foraminous surface, which waterleaf, when dried at a temperature below about 50° C., has a dry tenacity at least equal to its couched wet tenacity. An additional characteristic of such binder particles is an ability, when a plurality of the said binder particles is deposited concomitantly with staple fibers from a liquid suspension upon a foraminous surface, to bond the said fibers by physical entwinement of the said binder particles with the said fibers to give a composite waterleaf with a wet tenacity of at least about 0.034 lb./in./oz./yd.$^2$. The preferred structures are extremely "supple" in liquid suspensions, having at least one dimension of minor magnitude relative to the largest dimension, i.e. the binder particle is fiber-like or film-like. Usually in any mass of binder particles the individual binder particles are not identical in shape and may include both fiber-like and film-like structures. Expressing the preferred "minor" dimension in terms of denier as determined in accordance with the fiber coarseness test described in TAPPI 41, 175A–7A, No. 6 (June), 1958, the particles have a denier between about 1 and about 15.

The relative distribution of matrix component and dispersed component in the binder particles of the pulp of the present invention is not uniform. They are characterized by the presence of outer portions which are relatively high in concentration of polysaccharide, while the inner portions of the particles are relatively rich in synthetic polymer of the dispersed phase. However, they are not smoothly coated spherical particles of the dispersed polymer such as might be obtained by applying a surface coating of wax or other material to the exterior of glass beads or the like. They exhibit an essentially hydrophilic behavior, being readily dispersed and suspended in water even though they are composed to the extent of 75% to 90% by weight of an essentially hydrophobic synthetic polymer.

(b) *Process.*—The process of this invention comprises forming a fluid mixture of a precipitatable polysaccharide with from about three to about twenty times by weight as much of a dispersion of synthetic thermoplastic polymer and thereafter precipitating the polysaccharide under shear conditions such that the system has an $R'_d$ value, as defined below, of between about 1 and about 1000. The word "precipitating" is used in the broad meaning of "separating from solution," and includes aqueous-phase reactions which give rise to an insoluble reaction product. It includes specifically the preferred method of operation in a mixture of sodium cellulose xanthate and dispersed polymer phase in an aqueous alkaline medium is caused to react with an acidic salt solution, under conditions of shear as stated, to form composite binder particles in which the dispersed thermoplastic polymer exists in a matrix of cellulose. The pulp of binder particles so formed may thereafter be deposited from an aqueous suspension onto a foraminous surface to form a non-woven sheet product suitable for further treatment, such as pressing, fusing, sintering and related operations.

DEFINITIONS AND TEST PROCEDURES

Initial modulus is determined by measuring the initial slope of the stress-strain curve.

Orientation angles are measured by drawing a line from each end of the arc of the second equitorial spot to the center of an X-ray diffraction pattern of a sample of a fiber. The angle formed by these lines is called the orientation angle and reflects the alignment of the crystallites with respect to the fiber axis or direction of draw in a fiber or film.

Gel swelling is a measure of the amount of liquid retained by regenerated cellulose yarns which have not been dried. Gel swelling is reported as a percentage of the weight of the oven-dried yarn and frequently falls in the range of 200–400%.

Bulk density is determined by filling with firm hand pressure a 30 ml. beaker with dried fluffed fibers, weighing the fibers, and dividing by the volume. This is a semi-quantitative measurement which is estimated to be precise within ±25%.

Water absorption is measured by evenly distributing, without compression, a two-gram sample of the material in a Büchner funnel (2½ inch diameter x 1 3/16 inches deep). One hundred ml. of water containing 0.1 gram of sodium lauryl sulfate is poured over the sample and allowed to drain by gravity for about 1 minute. The funnel is then connected to an overflowing reservoir so as to produce a ⅜ inch head of water in the funnel at equilibrium. When water begins to flow into the funnel, a No. 11 rubber stopper weighing 67.4 grams is placed on the sample with the large face down. A two-pound weight is placed on the stopper. After ten minutes the petcock is turned to permit the sample to drain. After an additional ten minutes the sample is removed and weighed.

The tensile strength of sheet materials is determined by modification of TAPPI Test T205m53 in which the pulp slurry is poured onto a 100-mesh screen to make a sheet which is washed with 10 liters of water, removed from the screen, and dried in an oven with air maintained at approximately 100° C. One-half inch strips are cut from the sheet and the strength measured on an Instron tester. The values are calculated on the basis of a one-inch strip. To determine the wet strength, one-half inch strips are cut from the dried sheet and placed in water, where they are soaked for 30 minutes at room temperature. The wet strength is also measured on an Instron tester and the results calculated on the basis of a one-inch width. Tenacities expressed as grams/denier may be converted to values expressed as lbs./in./oz./yd.$^2$ by multiplying by 17.

Elmendorf tear strength is measured on the Elmendorf tear tester according to the procedure described in TAPPI Test T414m49. The strength recorded is the number of grams of force required to propagate a tear the remaining distance across a 63 mm. strip in which a 20 mm. standard cut has been made.

Basis weight is the weight per unit area of a non-woven structure.

Tear factor is calculated by dividing the Elmendorf tear strength in grams by the basis weight in g./m.$^2$.

Burst strength is measured on the Mullen burst tester according to the procedure described in TAPPI Test T403m53.

Fold endurance is determined by TAPPI Test T423m50, using the M.I.T. folding endurance tester.

Example 1

A blend of viscose and polyvinyl chloride is prepared by mixing equal parts by weight of a 46% solids dispersion of polyvinyl chloride and a viscose containing 5% cellulose. The viscose has an index of 8.0, a viscosity of 100 Du Pont seconds, and a total solids content of 6.25%. Two hundred parts of this blend are stirred for two hours in a round-bottom flask which was chilled with ice. A portion of the stirred mixture is then formed into a pulp of sheet-forming binder particles by pouring the polymer blend into a rapidly agitated Waring Blendor containing a coagulation bath which consists of 17% sodium sulfate, 9% zinc sulfate and 5% sulfuric acid. Sixteen hundred parts of the coagulating bath composition are employed with 100 parts of the polymer blend. The agitation is continued for one minute. At the end of that time regeneration is complete and the binder particles are separated by filtration. They are then redispersed in water and combined with high tenacity rayon staple, ¼ inch long, 1.7 denier per filament. Fourteen parts of the staple and 6 parts of the binder particles are used, and a waterleaf is formed using a papermaker's handsheet mold. The sheet is pressed at 220° C. with a pressure of 1000 p.s.i. for 90 seconds. The resulting sheet has a tenacity of 9 lbs./in./yd.$^2$, an elongation of 10.2% and an initial modulus of 375. A portion of the binder particles is analyzed for chlorine and found to be 46.3% chlorine based on polymer. This indicates that the final composition of the binder particles is 82% of the vinyl polymer and 18% of the cellulose.

The sheet pressed under these conditions is somewhat stiff but strong, as the tenacity figure indicates. The pressing operation causes the thermoplastic component of the binder particles to flow, and thereby bond the staple fibers. The high strength of the final sheet is due to the presence of the thermoplastic vinyl chloride polymer, while the easy dispersion of the binder particles is due to the cellulose content. In spite of the fact that the cellulose composes only 18% of the binder particles, they behave as highly hydrophilic materials, dispersing as readily as 100% cellulosic particles, and being free from any tendency to settle out. Microscopic examination reveals that the polyvinyl chloride is present in the binder particles in the form of the same small discrete particles which were used to make the polymer blend.

The viscose, polyvinyl chloride dispersion blend and coagulating fluids described above are combined in another embodiment using a "tube fibridator" as described and illustrated in FIGURE IV of United States Patent 2,988,782, dated June 20, 1961, following the technique of Example 102 of that patent. The binder particles obtained are shown herein as photomicrographs in FIGURES I, II and III at magnifications of 30×, 60× and 100×. Photomicrographs of microslices showing cross sections of the particles at magnifications of 7000× and 16,500× are shown as FIGURES IV and V. Microslices from which the synthetic polymeric component has been removed by extraction with tetrahydrofuran are shown as photomicrographs at a magnification of 7000× in FIGURES VI and VII.

The above example shows the use of polyvinyl chloride polymer as the synthetic components of the polymer blend. However, in addition to that material other formulations are also suitable. Among the polymer compositions which may be employed as equivalent to the above are vinylidene chloride copolymers, acrylate ester terpolymers comprising ethyl acrylate, methyl acrylate and acrylic acid, polyvinylacetate, styrene-butadiene copolymer elastomers, homopolymeric polystyrene polyvinyl chloride copolymer compositions, plasticized polyvinyl chloride, and other plasticized polymers of the types already mentioned.

Example 2

A viscose consisting of 5.5% cellulose, 5% sodium hydroxide and 31% carbon disulfide and having an index of 3.5 and a viscosity of between 70 and 80 Du Pont seconds is employed as the matrix component of the polymer blend. The synthetic polymer employed is a finely divided dispersion of a copolymer of perfluorinated propylene and perfluorinated ethylene, as described in United States 2,946,763 consisting of 60% solids with an added 3.6 parts per hundred of alkyl phenoxy polyethylene oxide, a synthetic wetting agent sold under the trademark Triton X–100. The dispersion is alkalized with ammonia to a pH of 10 and is blended with the viscose in a ratio of one part of the perfluorocarbon polymer dispersion to 1.1 parts of the viscose. The two polymer components are well mixed and then added, as a stream of approximately 1/16 of an inch in diameter, to a shear regeneration system. The regeneration bath consists of a 10% solution of ammonium sulfate. Eighty parts of the polymer blend are added to 330 parts of the bath in a one quart Waring Blendor operating at 7000 r.p.m. Stirring is reduced to 5000 r.p.m. as soon as the polymer is all added. At that point 400 cc. of a 20% solution of sulfuric acid is added, and stirring again continued for five minutes. The polymer precipitates as a fibrous, hydrophilic pulp of two-component binder particles which is separated from the bath by filtering on a 100-mesh screen and is washed with water until it is acid-free.

The washed pulp of binder particles is then redispersed in 5 liters of water and deposited on a 100-mesh screen in a hand mold using little vacuum. The sheet is couched from the screen with a 34 lb. couching roll, damp-dried by blotting and is sintered at 390° C. in a press at contact pressure for five minutes. The result is a strong, porous sheet consisting entirely of perfluorocarbon polymer, the cellulose having been carbonized off entirely.

A sheet of the same type is made substituting an aqueous dispersion containing 60% solids by weight of polytetrafluoroethylene resin for the dispersion of copolymer identified above.

*Example 3*

One part by weight of a polytetrafluoroethylene dispersion of polytetrafluoroethylene (60% by weight) dispersed in water containing 3.6% by weight of an alkylphenoxy (ethylene oxide) non-ionic dispersing agent and sufficient aqueous ammonia to raise the pH of the dispersion to 10 is blended with 1.1 parts of the viscose of Example 2. This mixture will be preferred to as the "resin-viscose blend." Fifty grams of the resin-viscose blend is added to 300 milliliters of an aqueous 10% ammonium sulfate solution in a Waring Blendor operating at 9,000 r.p.m. After addition of the blend is completed, the speed is reduced to 6,000 r.p.m., 400 ml. of a 10% aqueous sulfuric acid solution added, and stirring continued for five minutes. The pulp of binder particles formed is washed with distilled water until acid-free. A sheet is formed from the pulp by the technique described above and the wet, washed sheet is sintered at 380° C. The sintered sheet has a brown color due to the presence of decomposed cellulose, but can be bleached white with a hot mixture of concentrated sulfuric and nitric acids.

The sintered sheet has a tenacity of 0.04 g.p.d. (0.68 lb./in./oz./yd.²), and elongation of 38%, an Elmendorf tear strength of 406 g. a Mullen burst strength of 32 p.s.i., and a basis weight of 556 g./m.² when the Blendor is operated at 12,000 r.p.m., using 40 grams of the resin-viscose blend.

Similar results are obtained when 8 ml. or 16 ml. of a 5.78% sodium hydroxide solution is added to 30 grams of the resin-viscose blend prior to precipitation.

*Example 4*

Eighty grams of resin-viscose blend of the previous example is added to 300 ml. of a 20% aqueous sodium sulfate solution in a 1 qt. Waring Blendor operating at 11,000 r.p.m. After delivery of the blend is completed, the speed of the stirrer is lowered to approximately 200 r.p.m., 400 ml. of a 10% sulfuric acid solution added, and stirring continued at this speed for 5 minutes. The precipitate of binder particles is filtered and washed with water until acid-free. The fibers are then slurried and deposited on the screen following the technique described in the previous example. The sheet is removed from the screen, blotted until damp dry, and sintered at 390° C. for 5 minutes. The sintered sheet has the following properties: tenacity=0.05 g.p.d (0.85 lb./in./oz./yd.²), elongation=66%, tongue tear strength=0.11 lb./oz./yd.², Elmendorf tear strength=214 g., tear factor=0.51, basis weight=426 g./m.², and thickness=20 mils.

Equivalent properties are obtained by carrying out the entire precipitation cycle, i.e. no slow-down during addition of the sulfuric acid with the stirrer operating at 5,000 r.p.m. When the stirrer speed during the entire precipitation and regeneration cycle is reduced to 3,800 r.p.m., the final sintered sheet obtained has the following properties: tenacity=0.03 g.p.d. (0.51 lb./in./oz./yd.²), tongue tear strength=0.05 lb./oz./yd.², Elmendorf tear strength=208 g., basis weight=692 g./m²., tear factor=0.31, and thickness=30 mils.

*Example 5*

Eighty grams of resin-viscose blend of Example 3 is added to a precipitant containing 200 ml. of a 10% sodium sulfate solution and 100 ml. of a 2% sulfuric acid solution in a 1 qt. Waring Blendor operating at approximately 7,500 r.p.m. After all of the blend is added, the speed is lowered to approximately 3,200 r.p.m., 200 ml. of a 10% sulfuric acid solution added, and stirring continued at this speed for 5 minutes. The binder particles formed are collected on a filter and washed until acid-free. A sheet is prepared from the fibers by the technique described in the previous examples. It is removed from the screen, blotted until dry and sintered at 390° C. for 5 minutes. The sintered sheet has the following properties: tenacity=0.05 g.p.d. (0.85 lb./in./yd.²), elongation=88%, tongue tear strength=0.12 lb./oz./yd.², Elmendorf tear strength=182 g., basis weight=406 g./m.², tear factor=0.46, and thickness=15 mils.

*Example 6*

The resin-viscose blend described above is diluted with 25% of its weight with water. This diluted blend is added at the rate of 140 grams/minute to a 5 gallon trapezoidal can filled to within five inches of the top with an aqueous coagulating and regenerating bath maintained at 36° C. stirred with a Lightning mixer at 3,000 r.p.m. and containing 15% sodium sulfate and 1% by weight of sulfuric acid. Simultaneously, fresh bath of the same composition is added at the rate of 17 lbs./min. The excess bath and the binder particles formed are removed through an overflow pipe and the fibers collected in a 100-mesh wire screen basket. They are dispersed for one hour in a 2% sulfuric acid solution maintained at 90° C., and then washed with water until free of acid and salt. Processing is continued until 8 lbs. of product is obtained.

The pulp of binder particles is dispersed in water and deposited on a 100-mesh screen, as described above. The sheet is removed, blotted until dry, and sintered at 400° C. for 5 minutes. The sintered sheet has the following properties: tenacity=0.02 g.p.d. (0.33 lb./in./oz./yd.²), elongation=48% and tongue tear strength=0.05 lb./oz./yd.².

*Example 7*

A viscose solution based on 5% cellulose, and 5.5% sodium hydroxide, having an index of 3.8 and a viscosity of 195 Du Pont seconds is blended with a latex of polyvinyl chloride in a 1 to 1 volume ratio, to give a final polymer mixture having 11 parts of polyvinyl chloride solids to one part of cellulose. Following the general procedure of Example 2, this mixture is regenerated by pouring the material into a bath of sodium sulfate with sulfuric acid added to complete the regeneration. The resulting two-component binder particles are washed and then blended with a wood pulp consisting of a blend of 80 parts of pine and 20 parts of gum pulp. Blends are made in which the binder particles are used in the range of 2 to 20%, the rest of the material being the pulp.

Handsheets prepared from these blends are pressed at 150° C. at 500 p.s.i. for thirty seconds have a dry tensile strength of between 6 and 8 lbs./in./oz./yd.², while the wet tensile strength ranges from 0.6 to 0.7 lb./in./oz./yd.².

In similar experiments a 14% dispersion of fine powdered methoxymethyl-substituted polyhexamethylene adipamide is blended with viscose as described above. The blend of polymers is precipitated into particles in the manner described above and excellent binder particles are obtained. These particles are employed as binders for non-woven sheets of nylon staple fibers and also as additives to wool pulp.

*Example 8*

A mixture of that portion of ground linear polyethylene having a melt index of 0.5 retained on a 200 mesh screen and the viscose of Example 1 is blended in proportions to give a 10 to 1 ratio of polyethylene to cellulose solids by weight. The combined fluid mass is poured into a bath composed of five parts of 20% sodium sulfate solution and one part of a 5% sulfuric acid solution in a Waring Blendor operating at 5,000 r.p.m. The ratios of polymer blend and coagulating bath are the same as those given in Example 1. After coagulation, regeneration is completed by the addition of an equal amount of sulfuric acid (5%) which is added to the Blendor and allowed to stand for five minutes. The suspension of binder particles is washed acid-free, redispersed in water, and used for blending with conventional kraft pulp having a freeness of 352 in a 50–50 ratio. Handsheets prepared from this blend after pressing at 200° C. under 900 p.s.i. for one minute have a dry tensile strength of 7.69 lbs./in./oz./yd.² and a wet tensile strength of 3.25 lbs./in./oz./yd.² (the wet strength retention thus being 42.3%). The sheet has a tongue tear strength of 0.063 lb./oz./yd.².

*Example 9*

An aqueous dispersion of polyacrylonitrile is prepared from 0.10 part of potassium persulfate, 2.0 parts of sodium lauryl sulfate, 120 parts of water and 80 parts of acrylonitrile. A stainless steel kettle is used and the free space of the kettle is flushed with nitrogen gas and then sealed. After mixing the contents by relatively mild agitation for 16 to 17 hours at 40° C. the resulting polymer dispersion contains 36% solid material as determined by evaporation of a portion of the dispersion. The aqueous polymer dispersion is diluted with an equal volume of water containing 1% by weight of sodium alginate. Binder particles are prepared from this modified aqueous dispersion by pouring the dispersion slowly into a Waring Blendor containing a solution consisting of 70% by weight of aqueous zinc chloride and 2% by weight of hydrochloric acid. Binder particles are obtained by shear coagulation and these coalesce in a few seconds.

In another experiment, the same dispersion is precipitated using a 5% aqueous $CaCl_2$ solution.

*Example 10*

A 1% solution of sodium alginate is blended with an equal weight of an aqueous dispersion containing 5% by weight of a nylon copolymer (containing 80% by weight polycaproamide and 20% by weight poly(hexamethylene adipamide) and ground to pass through a 0.020 inch screen). Sixty grams of this blend is added to 300 ml. of a 2% calicum chloride solution in a Waring Blendor operating at approximately 13,800 r.p.m. The binder particles obtained are washed with distilled water until free of salt, redispersed in 4 liters of water, and deposited on a 100-mesh screen. The waterleaf has a re-wet tenacity of 0.03 lb./in. per oz./yd.² and a dry tenacity of 1.5 lbs./in. per oz./yd.².

Another batch of binder particles so prepared is blended with ¼" 1½ denier 66 nylon fibers in a sodium alginate solution to give a slurry containing 25% by weight nylon staple, 66% by weight binder particles, and 9% by weight sodium alginate. This slurry is deposited on a 100-mesh screen to give a waterleaf which after pressing at 175° C. under 550 p.s.i. for 30 seconds has a dry tenacity 4.5 lbs./in. per oz./yd.², a tongue tear 0.34 lb./oz./yd.², and a Mullen burst strength 12 p.s.i./oz./yd.².

*Example 11*

A cellulose xanthate is prepared by adding approximately 26% by weight of carbon bisulfide (based on cellulose) to alkali cellulose. This is dissolved in caustic solution to form a viscose containing 5% cellulose and 9% caustic (calculated as sodium hydroxide), which is ripened to a salt index of 4.0. One hundred grams of this viscose is blended with a dispersion of polyvinyl chloride dispersion to give a mixture of 90 parts of polyvinyl chloride to every ten parts of cellulose. This dispersion is added at the rate of 100 grams/min. to a mixture of 1000 milliliters of 20% sodium sulfate solution and 550 milliliters of 2% sulfuric acid solution in a 5 quart Waring Blendor operating at approximately 8000 r.p.m. Simultaneously, with the addition of the polymer blend, there is introduced into the Blendor a 2% solution of sulfuric acid added at the rate of 60 milliliters per minute. The agitation produces a finely divided binder particle precipitate of cellulose and polyvinyl chloride which is washed by decantation with water. The precipitate is examined under an electron microscope and is shown to consist of a matrix containing approximately 10% cellulose surrounding and supporting a 90% by weight of dispersed finely divided particles of the polyvinyl chloride. In spite of the high concentration of hydrophobic material, the binder particles are hydrophilic in nature. They are readily dispersed in water and stay suspended in an aqueous slurry. A portion of this precipitate is suspended in 4 milliliters of water and deposited on a 100-mesh 8 x 8" screen. After drying at 100° C., the sheet has a dry tenacity of 0.06 g.p.d., a dry elongation of 7.5%, and a wet tenacity of 0.01 g.p.d. A second portion is suspended in 4 liters of water with twice the weight of a 1½ denier per filament high tenacity rayon staple. The resulting suspension is diluted to a total volume of 3000 milliliters with 1% sodium carboxymethyl cellulose and a few drops of alkyl phenoxy polyethylene oxide. The slurry is agitated to provide a uniform mixture and a sheet is formed by depositing the slurry on a 100-mesh screen. The sheet is then pressed at 100° C. at 300 p.s.i. until dry and is then further pressed at 200° C. and 900 p.s.i. for one minute. The resulting sheet has a high dry tenacity and when wet retains 60% of its dry tenacity.

*Example 12*

The procedure of Example 11 is followed as described above except that, in place of the polyvinyl chloride dispersion, there is used an aqueous dispersion containing 60% by weight polytetrafluoroethylene resin to produce a 9 to 1 ratio of synthetic polymer to cellulose. The fibrous particles are washed and are used in preparation of a handsheet which is strong when formed on the screen and which can be handled readily. This handsheet is then dried and sintered at 360° C. to destroy the cellulose and fuse the polytetrafluoroethylene resin particles forming a strong, air-pervious flexible sheet consisting almost entirely of polytetrafluoroethylene resin.

*Example 13*

Ninety grams of viscose of 5.0% cellulose, an index of 8.0 and a viscosity of 95 Du Pont seconds is blended with 10 grams of 0.1–0.5 micron diameter particles of a copolymer of 94% by weight acrylonitrile and 6% methyl acrylate. Eleven grams of this slurry is added to 300 ml. of an aqueous precipitating bath in a 1 qt. Waring Blendor operating at approximately 5,000 r.p.m. The precipitating bath contains 18.5% by weight of sodium sulfate and 0.5% by weight of sulfuric acid. The binder particles formed are washed until acid-free. 1.1 grams of the particles are blended in 4 liters of water with 2.8 grams of ¼ inch 2½ denier filaments having the same polymer composition as the polymer in the dispersion. The fibers in the slurry are deposited on a 100-mesh screen and the sheet washed and dried at 100° C. After pressing at 200° C. and 500 p.s.i. for 30 seconds, the sheet has a dry tenacity of 2.4 lbs./in. per oz./yd.² and a wet tenacity of 0.84 lb./in. per oz./yd.².

*Example 14*

Twenty grams of a blend of equal parts of the viscose of Example 2 and an aqueous dispersion containing 52% by weight of particles of an 85/15 vinylidene chloride/vinyl chloride copolymer is added to 300 ml. of the precipitating bath of Example 13 in a 1 quart Waring Blendor operating at 6,900 r.p.m. The binder particles so formed are washed with water until acid-free and dispersed in 4 liters of water. Three sheets are prepared from three batches of binder particles so formed by adding to the slurry of binder particles 2 grams of (a) ¼" 3 denier 94/6 acrylonitrile/methyl acrylate copolymer filaments, (b) ¼" 1½ denier 66 nylon filaments and (c) ¼" 3 denier poly(ethylene terephthalate) filaments and thereafter depositing the solids in the slurry on a 100-mesh screen. After drying at 100° C., the waterleaf has the properties shown in Table I.

TABLE I

| Staple Fiber | Dry Tenacity, lb./in./oz./yd.² | Wet Tenacity, lb./in./oz./yd.² | Tongue Tear Strength, lb./oz./yd.² | Mullen Burst Strength, p.s.i./oz./yd.² |
|---|---|---|---|---|
| (a) | 2.12 | 1.71 | 0.27 | 9 |
| (b) | 1.00 | 0.34 | 0.13 | 2 |
| (c) | 1.87 | 0.79 | 0.04 | 2 |

*Example 15*

Sixty grams of a blend of equal parts of the viscose of Example 2 and an aqueous dispersion containing 36.7% by weight of polychloroprene having particle sizes in the range 0.1–0.3 micron is added to 300 ml. of the precipitating bath of Example 13 in a 1 qt. Waring Blendor operating at approximately 6,000 r.p.m. The binder particles formed are washed with water until acid-free and 0.3 gram are added to 4 liters of water and blended for 5 minutes with the aid of a Vibro mixer with 3.7 grams of a kraft pulp having a freeness of 400. The slurry is deposited on a 100-mesh screen and the sheet obtained washed and dried at 100° C. The dried sheet has a dry tenacity of 6.9 lbs./in. per oz./yd.², a wet tenacity of 0.63 lb./in. per oz./yd.², an Elmendorf tear factor of 1.63, and a Mullen burst strength of 12.8 p.s.i./oz./yd.². The wet strength of the sheet is 9.1% of the dry strength as compared to 5.4% for a sheet containing no binder particles prepared from the same kraft pulp.

*Example 16*

Sixty parts of an aqueous dispersion containing 19.3% polyacrylonitrile is added to 20 grams of a viscose containing 4.93% by weight of cellulose, 2.45% of caustic (calculated as sodium hydroxide) having viscosity of 326 Du Pont seconds and a salt index of 23.1. Stirring is continued until the blend is homogeneous. 50 grams of this blend are added over a period of 30 seconds to 300 ml. of a coagulating bath in a Waring Blendor operating at approximately 10,000 r.p.m. The coagulating bath contains 18.5% by weight of sodium sulfate and 2.5% by weight of sulfuric acid in water. Stirring is continued for an additional 30 seconds following which 300 ml. of 5% sulfuric acid are added and the mixture allowed to stand at room temperature for 30 minutes without stirring. The binder particles formed are filtered on a coarse glass filter and washed until acid free.

Three batches of products are prepared in this manner and the combined products are dispersed in 2 liters of water. Ten grams of this slurry is deposited on a coarse glass filter to form a sheet which is then immersed in a 60% calcium thiocyanate solution at 100° C. for 10 minutes and thereafter washed free of calcium thiocyanate. The resulting sheet, in which the continuous phase is polyacrylonitrile rather than cellulose, is dried between pulp sheets at 105° C. under sufficient pressure to prevent deformation.

The examples above illustrate the practice of this invention with the preferred matrix-forming materials, cellulose and alginate polymer. Most conveniently, cellulose is employed, since it can readily be formed as a matrix by regeneration from viscose. Because of its superior ability to blend with other cellulosic fibrous materials, this is the most desired embodiment. However, other polysaccharides and polysaccharide derivatives may also be used. These include natural gums, such as guar gum, locust bean gum and karaya gum, and soluble starch and starch derivatives.

GENERAL PROCESS CONDITIONS

In the process of this invention the polysaccharide polymer is precipitated from solution under conditions of shear such that the precipitating polymer, as it transforms from a mobile liquid into a fully setup solid, is subjected to relatively high shearing forces while it is in a transient plastic deformable state. The variables involved in determining the proper set of conditions to produce this result include: (a) the viscosity of the dispersion and precipitant, (b) the rate at which the polymer is precipitated, (c) the deformability of the precipitate, and (d) extent of the shearing force applied to the precipitated polymer before it becomes so rigid that further shear has little or no effect on the structure or nature of the precipitate.

The three variables which play a major role in controlling the nature of the product are:

(1) The shearing stress, $S_p$, supplied by the precipitant as it enters the shear zone, (2) The rate of shear, $R_d$, of the polymer dispersion as it is converted to an elongated article, which depends upon, among other things, the viscosity, $V_s$, of the dispersion, (3) The length of time, $t$, that the solution is in a deformable state (i.e., prior to complete precipitation).

The rate of shear, R, is proportional to the shearing stress, S. Introducing the viscosity, V, as a proportionality constant, the equation becomes $$S = VR$$

Using the subscript $d$ for the dispersion and the subscript $p$ for the precipitant, the shearing stress in the precipitant and in the dispersion is given by the equations $$S_p = V_p R_p \quad (1)$$
$$S_d = V_d R_d \quad (2)$$

It is reasonable to assume that the shear stress is transmitted undiminished from the precipitant to the dispersion, so that $$S_p = S_d \quad (3)$$

and Equations 1 and 2 may be equated to give $$R_d \frac{V_p}{V_d} = R_p \quad (4)$$

The type of fiber products formed will depend on $t$, the microsecond interval during which the precipitate is deformable. The product $R_d t$ will be designated $R_d'$ (the total shear), which is determined from relationship $$R_d' = \frac{V_p}{V_s} R_p t \quad (5)$$

The total shear can be calculated by Equation 5 if $R_p$ and $t$ are known. For a stirring device, such as the Waring Blendor, the shear rate in the precipitant, $R_p$, can be expressed as follows:

$$R_p = 0.005 a^{3/2} b^{-1/2} Q^{3/2} V_p^{-1/2} d_p^{1/2} \qquad (6)$$

$$R_p = 0.137 a^{6/5} b^{-4/5} Q^{6/5} V_p^{-1/5} d_p^{1/5} \qquad (7)$$

in which
$a$ = the distance in centimeters from the axis to the tip of the stirrer blade
$b$ = average width of stirrer blade in centimeters
$Q$ = stirring speed in r.p.m.
$V_p$ = viscosity of the precipitant in poises
$d_p$ = density of the precipitant in gram/cc.

Equation 6 is used if the flow is laminar, i.e., if the Reynolds number, $R_e$, is smaller than 3350; Equation 7 is used if the flow is turbulent, i.e., $R_e$ is greater than 3350. The Reynolds number is determined by the equation $$R_e = \frac{\pi}{60} a b \frac{d_p}{V_p} Q \qquad (8)$$

As mentioned earlier, the type of fiber products formed will depend on $t$, the time interval during which the precipitant is deformable. In calculating $t$ for these systems, it is assumed that the dispersion droplet in the shear zone coagulates or precipitates because coagulant, or precipitant, diffuses from the bath into the drop until a certain critical concentration is attained at a distance of 0.1 micron from the droplet surface. This critical concentration is the "molarity needed for coagulation." It will be designated $C$ and expressed in mols per liter.

The diffusion equation which is appropriate for these calculations is $$C = C_0 [1 - \psi(x/2\sqrt{Dt})] \qquad (9)$$

where
$C$ = molarity needed for coagulation
$C_0$ = bath concentration (molar)
$x$ = distance diffused (0.1 micron)
$D$ = diffusion constant ($10^{-5}$ cm.$^2$/sec.)

$$\psi = \frac{2}{\sqrt{\pi}} \int_0^{\frac{x}{2\sqrt{Dt}}} e^{-y^2} dy \qquad (10)$$

There is good theoretical justification for selecting values close to 0.1 micron for $x$ and close to $10^{-5}$ cm.$^2$/sec. for $D$, although the selection of these exact values is somewhat arbitrary. For convenience, it is assumed that $D$ is the same for all ions, since this assumption introduces little error in the final calculations.

One of the more important systems for use in this invention is one in which the polysaccharide polymer is sodium cellulose xanthate and the aqueous medium is an aqueous alkaline solution. This system is commonly known as viscose and it is used particularly effectively in conjunction with halogenated hydrocarbon polymer dispersion as the particulate material. Table II lists C values for all salts which are commonly used with viscose.

TABLE II

| | |
|---|---|
| Lithium chloride | 3.94 |
| Sodium nitrate | 3.90 |
| Sodium chloride | 2.65 |
| Sodium sulfate | ¹2.20 |
| Potassium chloride | 1.50 |
| Ammonium sulfate | ¹1.30 |
| Barium chloride | 0.75 |
| Ethylenediamine sulfate | 0.42 |
| Magnesium sulfate | 0.30 |
| Trimethylbenzylammonium sulfate | 0.18 |
| Sulfuric acid | ¹0.050 |
| Hydrochloric acid | 0.028 |
| Zinc sulfate | 0.0060 |
| Cadmium sulfate | 0.0018 |

¹ Molarity of cation.

The value of $C$ will depend on such variables as concentration, caustic content, DP, additives, etc. However, all of these variables are taken into account by the salt index, $S$, which is commonly used in the viscose industry. The salt index used to determine the effectiveness of precipitating baths is based upon the fact that the polymer is partially precipitated when a drop of solution is dispersed in an aqueous precipitant. When a definite and reproducible degree of precipitation is adopted as the end point, the concentration of precipitant required to reach the end point (expressed in percent of salt solution) which produces this end point is reported as the salt index for that system.

In making this test, a solution is prepared by adding an amount of 10% precipitant solution equivalent to the expected index along with sufficient water to make a total volume of 40 ml. For example, if the index is expected to be about 4.0, 16 ml. of the 10% salt solution and 24 ml. of water are added to a 250 ml. Erlenmeyer flask. The flask is then placed on a platform of a shaker (such as those made by the Clarksville Machine Company in Clarksville, Tennessee) and the precipitant solution is mixed by allowing it to shake for 28–35 seconds.

A test sample of polysaccharide solution is obtained by inserting a 6-inch long 5 mm. diameter glass rod into the viscose to a depth of 2 inches and withdrawing without touching the sides of the container. The solution is allowed to drain while holding the rod in a vertical position until the continuous stream breaks. The first two or three drops which fall from the rod are discarded and the third or fourth drop is allowed to fall into the flask containing the salt solution. The flask is returned to the shaker and shaken for 28–35 seconds. It is then removed from the shaker and the contents examined in good illumination while swirling the flask slightly to bring all of the contents into view. The proper end point, which should be complete in about 30 seconds after the shaking is completed, is the appearance of 2–5 small $\frac{1}{16}$–$\frac{1}{8}$ inch diameter flocks or tufts of whitish fibers similar in appearance to precipitated aluminum hydroxide. If no coagulation has occurred a higher concentration of precipitant is used in the next test. Conversely, if the coagulation is too extensive, a lower concentration of precipitant is used in the next test.

The $C$ values listed in Table II were determined using a viscose having a salt index of 16. $C$ should, therefore, be multiplied by $S/16$ before applying Equation 9 to a viscose of index other than 16. In order to obtain the proper value for $Y$ in the following equation, it is necessary that the index be determined on the modified viscose, i.e., after the synthetic polymer has been added to the viscose. The proper equation is, then $$Y = SC/16C_0 = -\psi(x/w\sqrt{Dt}) \qquad (11)$$

Values of $t$ are calculated by substituting selected values for $SC/16C_0$. When these values are plotted against $SC/16C_0$, it is found that $t$ becomes infinite when $SC/16C_0$ becomes one. Physically, this means that the fibrous precipitates of this invention cannot be formed from the modified viscose when $SC/16C_0$ i.e., $Y$, is greater than one. Accordingly, a graph is constructed showing the relationship between $t$ and $Y$ by selecting values of $Y$ between 0 and 1. If $C$ is not known, it may be determined by the salt index method. Thus, $Y$ can be calculated from the available experimental data on the coagulation bath and $t$ determined from the graph.

The discussion above is given with specific reference to the viscose-cellulose reaction system. This is the most complex of the systems to which the processes of the present invention are applied. Other reaction systems follow the same principles, with greater or lesser degrees of simplification. In all systems, the determination of the salt index value $S$ and the concentration value $C$ are made in the manner already described and the $R'_d$ value obtained from Equations 5 through 10 as shown above.

In some cases, a precipitant other than a sodium salt is necessary. For alginate polymers, for example, calcium chloride is the most convenient precipitant. The process of this invention is controlled so that the $R'_d$ values are between 1 and 1,000. It is preferred that $R'_d$ be between 19 and 150. Table III shows the calculation of $R'_d$ for some of the examples given below.

TABLE III

| Example | Percent | C | $C_0$ | Q(r.p.m.) | t[1] | $R'_d$ |
|---|---|---|---|---|---|---|
| 3 | | 1.30 | 1.60 | 9,000 | 2.4 | 38.9 |
| 3 | | 1.30 | 1.60 | 12,000 | 2.4 | 54.9 |
| 4 | | 2.20 | 3.36 | 11,000 | 2.0 | 40.9 |
| 5 | 6.7 | 0.97 | 1.09 | 7,500 | 2.3 | 29.9 |
| 6 | 15 | 2.21 | 2.40 | 3,000 | 2.7 | 98.3 |

[1] In microseconds.

For the 1 qt. Waring Blendor "$a$" is 3.0 centimeters and "$b$" is 0.7 centimeter. For the 12,000 r.p.m. equipment of Example 3 "$a$" is 4.5 centimeters and "$b$" is 1.0 centimeter. The viscosity of viscoses is usually expressed in Du Pont seconds. These can be converted to viscosity in poises by multiplying by the factor 0.31.

Some generalizations can be drawn from the equation for calculating $R'_d$ without reference to any specific experimental results. For example, if the particles obtained upon coagulating the polymer blend under a certain set of precipitating conditions are too fine, it is necessary to decrease the mechanical factor R (by decreasing the stirring speed or by increasing the viscosity), and/or decrease $t$. This quantity may be decreased by decreasing the salt index, S (which can be accomplished by increasing the cellulose DP, the cellulose concentration, etc.) or by increasing the bath concentration, $C_0$ or by decreasing C (which can be accomplished by heating the bath or by selecting a stronger coagulant, etc.). Conversely, if the particles are too coarse, R should be increased, $V_s$ decreased, and/or $t$ increased.

From the examples it is evident that a variety of fibrous binder particles containing regenerated cellulose products are obtained by precipitating a polymer blend of synthetic polymer and cellulose from solution under conditions which combine adequate shear with the proper rate of coagulation. The principal factors affecting the nature of the product obtained are the solution viscosity, the extent of shear applied during coagulation, and the nature of the precipitating bath. Of these, the precipitating bath is the most important.

The over-all effectiveness of the coagulating system is the primary factor regulating the process and the nature of the products. The rate of coagulation has the greatest effect on the nature of the product obtained. Another very important variable is the extent of shear applied to the precipitate while it is deformable. Accordingly, the shearing is varied in conjunction with the coagulation rate to produce a fibrous product with the desired properties. If a more rapid coagulant is used and if it is desired to produce a similar product it will be necessary to increase the rate of shear correspondingly. Bath variables, such as viscosity and temperature, have less effect on the properties of the products than the nature of the coagulant.

The over-all effectiveness of the bath as a coagulating agent can be determined by the salt index method familiar to the rayon industry. For convenience, this method has been described above. The table of molarities needed for coagulation given previously lists salts in order of increasing effectiveness as coagulating agents for cellulose xanthate in viscose, which is the preferred solution of this invention. Sodium sulfate, ammonium sulfate, or zinc sulfate or combinations of these salts, are used most frequently.

The major requirement on the shearing conditions during coagulation is that the shear be adequate to extend the precipitate into the form of a fibrous structure. Within the operable range the shear may be varied appreciably while still producing products of rather comparable properties. As indicated earlier, the products obtained at the higher shear levels are more suitable for papermaking operations.

Shearing action during coagulation of the viscose is dependent to some extent upon the design of the stirrer and the vessel in which precipitation occurs. Suitable shearing action for preparing the cellulose precipitates of this invention may be obtained by the use of a stirrer having the stirrer paddle or blade at an angle to the plane of rotation of the paddle or blade. Design of the stirrer blade used in a Waring Blendor has been found to be particularly satisfactory. Turbulence can be increased by introducing suitable baffles in a mixing vessel. This design is used in the commercial devices of the Waring Blendor type. The results indicate that cellulose precipitates with a particularly desirable morphology are obtained when precipitation occurs in a shear zone which is also turbulent. The combination of stirrer action and container design generally used in the practice of this invention produces precipitating conditions which combine turbulence with adequate shear.

Other types of apparatus may also be used provided they may be adapted to provide sufficient shear and turbulence. For example, blends of certain viscoses may be jetted into suitable coagulants to produce satisfactory precipitates. Other modifications may be devised by those skilled in the mixing art.

One particularly simple form of equipment is known as the tube precipitator. This consists of a straight tube through which the precipitant is passed at a high speed. The polymer solution is injected through a hole in the wall of the tube so that it hits the precipitant at a zone where a high rate of shear is present. Such a tube device has several advantages. It is suitable for continuous operation and is mechanically compact and simple, and it contains no moving parts. The tube device has a high degree of efficiency. A relatively small tube can produce large quantities of fibrids in continuous operation. Such tube precipitators are versatile. They work for many systems with different solutions, different polymers and different precipitants. In general, the principle of the tube is merely that the polymer solution is injected into the precipitant at the zone of highest shear.

Precipitates obtained using the tube precipitator have been found to be fully the equivalent of other binder particles prepared by other shear process in every property.

A simple form of the tube precipitator consists of a T tube within which polymer solution is fed into a stream of polymer under high shear. More sophisticated version of the same apparatus may also be used. The tube device can be employed to give highly uniform materials, because the shear can be precisely and uniformly controlled throughout the system. Calculations for shear rate in apparatus employing the tube device are identical with those for other types of shearing apparatus.

Viscoses useful in this process contain 0.5% to 20% cellulose, at least 0.2% sodium hydroxide, and have a salt index above 2.0. The most important single viscose variable in determining the limits of operability is the viscosity of the solution, which should be within the range from 1 to 150 poises. The viscosity is determined primarily by the degree of polymerization of the cellulose, the xanthate concentration, and to a lesser extent, by the caustic concentration.

Either the polysaccharide-polymer blend or the precipitant, or both, may contain additives for modifying the nature of the products obtained. This comprehends the use of additives in the polymer, in the bath, or both, which change or regulate the rate of coagulation by controlling diffusion. The solution and/or the precipitant may also contain synthetic and/or natural staple fibers, such as those from nylon, poly(ethylene terephthalate), or polyacrylonitrile, staple fibers, from cellulose, glass fibers, asbestos, etc. In addition, they may contain the fibrids described in copending application Serial No. 788,371, filed January 21, 1959, now U.S. Patent 2,999,788. They may also contain dyes, antistatic agents, surfactants, fillers, such as silica or titanium dioxide, pigments, antioxidants, etc. In general, it is more desirable to add fibrous materials to the precipitating or coagulating bath because of the greater difficulty associated with dispersing them in the viscous polysaccharide solutions.

The hand and other properties of sheet products prepared from the binder particles of this invention can be controlled and modified in many ways. The preferred method of operation involves the papermaking processes with staple fibers, which may be derived from cellulosic materials, staple of synthetic polymers or chopped synthetic fibers, or staple fibers of natural origin. The addition of such staple permits maximum utilization of the binding properties inherent in the synthetic polymer components. Within this area the properties can be controlled or modified by the choice of staple fiber, composition and/or length and/or denier. The properties of heterosheets, i.e., sheets from mixtures of binder particles and staple, particularly surface properties, may be controlled by the amount and type of pressure applied, calendering temperature, and the like. For example, waterleaves may be prepared from a properly selected combination of binder particles and staple which may be dried and pressed at suitable pressures and temperatures to fuse the staple and produce a precipitate-reinforced plastic sheet. Other sheet properties, such as absorbency, appearance, reflectance, color, surface smoothness, etc., can be modified by the use of fillers, sizes, dyes, wetting agents, etc.

The properties of the sheet products can also be modified by subjecting the binder particles to the beating operation customarily used for other cellulosic pulps. This usually results in the formation of a smoother, more uniform sheet, and frequently also results in the formation of stronger sheets. The beating operation is particularly advantageous when the fibrous products of this invention are being blended with kraft pulp.

As already indicated, the binder particles of this invention permit the combination of an essentially hydrophilic behavior with a large concentration of thermoplastic, usually hydrophobic, synthetic polymer. The hydrophilic behavior makes it easy for these binders to be used in conventional papermaking operations in conjunction with rayon staple fibers, wood pulp or other readily available fibrous materials. The thermoplastic synthetic polymer component, which is present in one preferred embodiment, can be activated as a permanent binder after sheet formation by heat and pressure, or by heat alone to give a final sheet product which, although derived from inexpensive materials equals or surpasses conventional non-woven and even woven fabrics in many end-uses.

Among the applications for such non-woven materials are disposable bedsheets and coverings (particularly for hospitals and other sanitary areas), disposable work clothes for use in activities involving exposure to radioactive materials, corrosive particles, reactive dusts and other hazardous matter, single-use underwear, slippers, night-clothes, aprons, shields, gloves, drape covers, dust-covers, wrapping materials and the like.

However, the sheet materials prepared using the particles of this invention need not be limited in their utility to disposable items. By proper choice of components and proper processing conditions, reusable, semi-permanent and permanent materials can also be prepared. In such applications are included book covers, tarpaulins, window shades, draperies, furniture dust-covers, table-linens, printing papers, interliners for suitcases, cardboard box paper and other structural paper, apparel fabrics, stiffeners and interliners for clothing, shoe bindings, backdrops and theatrical scenery, bedspreads, and other materials.

In another preferred embodiment, the particles of this invention provide non-woven air-pervious fibrous sheets, laminae, molds and formed objects of insoluble, difficultly-processable synthetic polymers such as fluorinated hydrocarbon polymers and the like. As shown in the examples, the use of a destructible cellulose matrix permits the formation of these polymers (as dispersed particles) directly into the form of usable objects which can be heated to remove the cellulose and coalesce the intractable polymer, giving the final product.

In this latter form, the use of binder particles containing fluorinated polyhydrocarbons is particularly desirable, for applications such as electrical insulating tape; filter media for gas and liquid-borne mixtures, including aerosols and corrosive or hot gases, where advantage may be taken of the chemical inertness of the polymer; missile nose cones; as ingredients in mixed-polymer molding powder formulations, as packing material for distillation towers and absorption columns; as pump, valve, piston and other packing materials; in combustion with other fibrous materials for frictional engaging surfaces such as disc clutch plates; and as multilayer laminates for bearings and gear blanks.

Other end-uses and applications, equivalent to the above, will also be readily apparent to those who are conversant with the art, as derived from the description already given.

I claim:

1. A pulp of sheet-forming binder particles of a precipitated polysaccharide, the said polysaccharide being selected from the group consisting of cellulose, alginate, soluble starch, and galactomannan gums and having a degree of polymerization of at least about 10, and the said particles containing from about 75% to about 95% by weight of a dispersed phase of particulate synthetic thermoplastic polymer having a particle size ranging from colloidal up to about particles passing a number 80-mesh screen but retained on a number 100-mesh screen and the said particles of said pulp having a high surface area and possessing (a) an ability to form a waterleaf having a couched wet tenacity of at least about 0.034 lb./in./oz./sq. yd. when an aqueous dispersion of the said pulp is deposited from a liquid suspension upon a foraminous surface, which waterleaf, when dried at a temperature below about 50° C., has a dry tenacity at least equal to its couched wet tenacity and (b) an ability, when a plurality of the said binder particles is deposited concomitantly with staple fibers from a liquid suspension upon a foraminous surface, to bond the said fibers by physical entwinement of the said binder particles with the said fibers to give a composite waterleaf with a wet tenacity of at least about 0.034 lb./in./sq. yd.

2. The pulp of claim 1 wherein the said polysaccharide is cellulose.

3. The pulp of claim 1 wherein the said polysaccharide is alginate.

4. The pulp of claim 1 wherein the said thermoplastic polymer is polyhydrocarbon.

5. The pulp of claim 1 wherein the said thermoplastic polymer is polyvinyl chloride.

6. The pulp of claim 1 wherein the said thermoplastic polymer is polyethylene terephthalate.

7. The pulp of claim 1 wherein the said thermoplastic polymer is a copolymer of 94% by weight acrylonitrile and 6% by weight methylacrylate.

8. The pulp of claim 1 wherein the said thermoplastic polymer is polytetrafluoroethylene.

References Cited in the file of this patent

UNITED STATES PATENTS

| | | |
|---|---|---|
| 2,810,646 | Wooding | Oct. 22, 1957 |
| 2,988,782 | Guandique et al. | June 20, 1961 |
| 2,999,788 | Morgan | Sept. 12, 1961 |